(12) United States Patent
Sarkar et al.

(10) Patent No.: US 8,977,249 B2
(45) Date of Patent: Mar. 10, 2015

(54) CUSTOMIZED RING TONES FOR MOBILE PHONES BASED ON CONTEXT INFORMATION

(75) Inventors: Shantanu Sarkar, San Jose, CA (US); Joseph Brian Burton, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 1503 days.

(21) Appl. No.: 12/157,569

(22) Filed: Jun. 11, 2008

(65) Prior Publication Data

US 2009/0311999 A1    Dec. 17, 2009

(51) Int. Cl.
*H04M 3/42* (2006.01)
*H04M 3/02* (2006.01)

(52) U.S. Cl.
CPC ............ *H04M 3/02* (2013.01); *H04M 3/42042* (2013.01); *H04M 3/42051* (2013.01)
USPC .......... 455/415; 455/418; 455/410; 455/411; 455/412.2; 455/413; 379/142.01; 379/142.06; 379/88.21; 379/93.23; 379/207.16

(58) Field of Classification Search
CPC ... H04M 1/57; H04M 3/42042; H04M 3/436; H04M 3/42059; H04M 15/06; H04M 1/575; H04M 1/663; H04M 3/42; H04M 3/42093; H04M 3/53391; H04M 3/54; H04M 19/04; H04M 1/2745; H04M 1/274508; H04M 1/56; H04W 4/16; H04W 4/12; H04W 4/24; H04W 68/12; H04W 76/064; H04W 8/183; H04Q 2213/13091; H04Q 3/0029; H04Q 3/72
USPC .............. 455/414.1, 415, 466, 418, 406, 410, 455/411, 412.2, 413, 518, 558; 709/217; 379/412.02, 142.14, 88.16, 355.01, 379/218.01, 142.01, 142.04, 142.06, 88.21, 379/93.23, 207.16, 142.17, 189, 207.13, 379/210.02, 211.01, 142.1
See application file for complete search history.

(56) References Cited

U.S. PATENT DOCUMENTS

| 7,668,538 | B2 * | 2/2010 | Rosenberg et al. ......... 455/414.1 |
| 7,792,264 | B2 * | 9/2010 | Pfleging et al. .......... 379/207.16 |
| 2004/0067751 | A1 * | 4/2004 | Vandermeijden et al. . 455/414.1 |
| 2006/0239242 | A1 * | 10/2006 | Huffschmid ................... 370/352 |
| 2007/0286101 | A1 * | 12/2007 | Gagne et al. .................. 370/260 |
| 2008/0063156 | A1 * | 3/2008 | Grohn et al. ............... 379/88.16 |
| 2009/0040588 | A1 * | 2/2009 | Tonar et al. ................... 359/267 |
| 2009/0220067 | A1 * | 9/2009 | Leeds ...................... 379/207.16 |

* cited by examiner

*Primary Examiner* — Fred Casca
(74) *Attorney, Agent, or Firm* — Baker Botts L.L.P.

(57) ABSTRACT

A method in one embodiment includes receiving, by a mobile client device, an incoming call sent by a caller, a caller ID being associated with the incoming call. A node connected to a packet-based network is accessed to obtain information about the caller. Information about the caller is then received from the node by the mobile client device. This information is applied to a set of client rules that selects a specific ring tone from a plurality of ring tones stored on the mobile client device. Finally, the specific ring tone is generated on the mobile client device to announce the incoming call.

19 Claims, 4 Drawing Sheets

CUSTOMIZED RING TONES FOR MOBILE PHONES BASED ON CONTEXT INFORMATION

TECHNICAL FIELD

This disclosure relates generally to the field of telephony; more particularly, to ring tones for mobile phones.

BACKGROUND

Caller ID is a service that determines and communicates the number/name of the calling party of an incoming call to the called device (i.e., a phone). Many modern telephone and telephony systems routinely offer this service, which is also known as Automatic Number Identification (ANI). Caller ID is also offered on communication systems that provide telephony services via packet-based networks, i.e., those that operate in accordance with the Internet Protocol (IP).

Ring tones—especially ones that include clips of familiar musical songs—are quickly becoming a popular way to identify a caller. A ring tone is any audio, video, or audio/video file or clip played at a mobile client device (i.e., mobile phone) to indicate an incoming call. For instance, a ring tone might consist of several bars of a familiar musical tune, and may also include a person's voice, or other distinctive sounds. The proliferation of mobile (cellular) telephones in recent years has given rise to a wide variety of ring tones. A user of a typical mobile phone may statically configure or set a predetermined ring tone for each individual in his personal address book. When an incoming call from an individual is received by the mobile phone, the caller ID is looked up in the phone's internal address book, and the associated ring tone is played to announce the call. One problem with this approach is that the association of the caller with the ring tone happens at the phone itself and is extremely static; that is, the user needs to manually configure the custom ring tone in his local address book on a person-by-person basis. This can be an arduous task when the number of entries in a person's address book is very large.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DESCRIPTION OF EXAMPLE EMBODIMENTS

Figure 1:
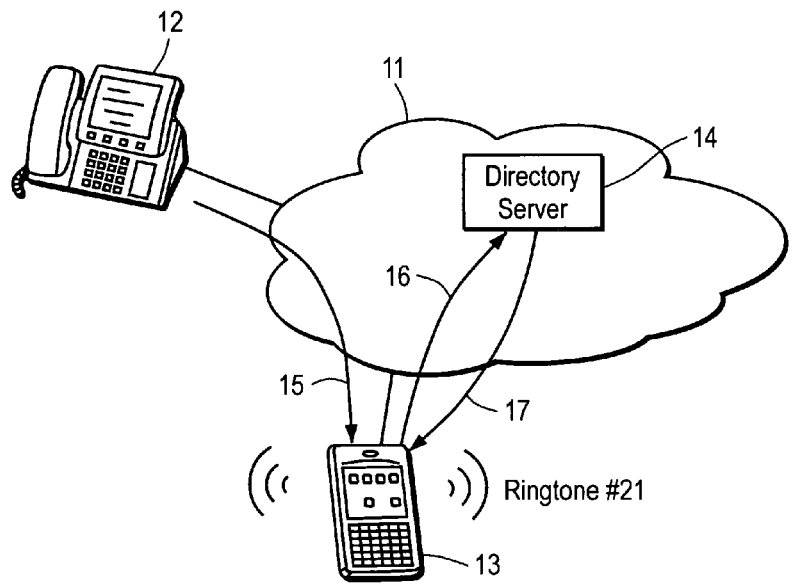
FIG. 1 illustrates an example communications system facilitating a call between an IP phone and a mobile client device.

In the following description specific details are set forth, such as device types, system configurations, communication methods, etc., in order to provide a thorough understanding of the disclosure herein. However, persons having ordinary skill in the relevant arts will appreciate that these specific details may not be needed to practice the embodiments described.

In the context of the present application, a communications network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, databases, edge devices (routers or switches), endpoint devices, and personal computers. The nodes typically communicate by exchanging discrete frames or packets of data according to predefined protocols.

It should be further understood that in the context of the present application the terms "Unified Communications" (UC) or "Unified Communicator" is broadly understood to refer to the integration of disparate communications systems, media, devices and applications. This may include the integration of fixed and mobile voice, e-mail, instant messaging, desktop and advanced business applications, Internet Protocol (IP)-PBX, voice over IP, presence, voicemail, audio, voice, and unified messaging into a single environment that offers the user a more complete, but simpler experience. Unified Communications thus refers to a real-time delivery of communications based on the preferred method and location of the recipient. Unified Communications may include software-based call-processing components which extend enterprise telephony features and functions to packet telephony network devices such as mobile client devices, media processing devices, VoIP gateways, and servers. In essence, Unified Communications integrates all of the systems that the user might already be using, allowing those systems to work together in real-time.

A phone or telephone is any device, component, element, or object capable of sending or receiving communications intended for a user or client over a network. A mobile phone or mobile client device may comprise a mobile phone (cellphone), smartphone, personal computer (PC), laptop, or notebook computer with telephony capability, personal digital assistant (PDA), or other mobile (i.e., wireless) communications equipment capable of presenting an incoming call to a user with an audible (or audiovisual) ring tone. A user or client is a person, or a person using a phone. Mobile communicator software, or mobile client software, refers to a software (or firmware) application that runs on a mobile handset or mobile phone that facilitates more effective communications for mobile client devices. For example, client software running on a mobile phone may comprise an application that enables communications with a directory server or rules server, and/or that enhances the capabilities of the mobile phone or smartphone.

According to one embodiment, a method of operation for a communication system is provided that configures ring tone settings on a mobile client device for individual callers or groups of callers based on contextual information attached to or associated with the incoming call. This contextual information is more than just a caller ID; that is, it may include information such as business organization affiliation, i.e., the particular group or department within an organization that an individual is associated with (e.g., finance, project team, family member, customer, etc.), the nature, type, or category of the call (e.g., urgent, low priority, high priority, etc.), and the reason for the call (e.g., return call in response to a voicemail message, scheduling of a meeting, etc.).

The contextual information may be transmitted to the mobile client device in a variety of ways. For example, in a 3G or above network a separate data channel is available to pass on the contextual information at the time of presenting the incoming call on the mobile client device. Alternatively, this information may be embedded in the call signaling itself. For example, the Session Initiation Protocol (SIP) call signaling protocol allows passing of Extensible Markup Language (XML) tags or messages, which fields may be utilized to embed call context information. Additionally, Integrated Services Digital Network (ISDN) permits user-to-user signaling that may be used for sending call context information. Furthermore, User-to-User Information Element (UUIE) messages include fields that may be used to transmit contextual information along with a call from an enterprise to a mobile client device. Other methods, including those yet to be developed, may also be utilized to transmit caller ID and contextual information associated with a call. Basically, any signaling protocol that allows tag or other contextual information to be attached to or associated with a call to a mobile client device is sufficient.

In a more specific embodiment, an enterprise mobile client device utilizes UC services to send a message that includes the contextual information of the incoming call to a rules server. The rules server then determines the presentation treatment (e.g., ring tone) to accord the call based on the caller ID/contextual information received. The appropriate ring tone is then sent by the rules server to the mobile client device. The mobile client device then applies that ring tone to the incoming call. By way of example, if the caller is a member of the user's project group, a happy musical ring tone may be applied to the call. In the other hand, if the call is from a person in the finance or budgeting department, a somber or serious ring tone song may be played to announce the incoming call.

Referring to FIG. 1, an example communications system facilitating a call between an enterprise IP phone 12 and a mobile client device 13 (e.g., a PDA) is shown. In this example, the call is transmitted over a 3G network 11. 3G is the third generation of mobile phone standards and technology based on the International Telecommunication Union (ITU) family of standards under the International Mobile Telecommunications program, IMT-2000. 3G networks are wide area cellular telephone networks that enable operators to offer users services that include a wide-area wireless voice telephony, video calls, and broadband wireless data, all in a mobile environment. These services provide the ability to transfer simultaneously both voice data (e.g., a telephone call) and non-voice data (e.g., downloading information, exchanging e-mail, instant messaging, etc.). In this embodiment, the non-voice data may also include contextual information (including the user ID or caller ID) associated with the incoming call. In FIG. 1 the incoming call is shown by arrow 15.

In response to the arrival of an incoming call, mobile client device 13 accesses UC services to determine the presentation treatment to accord the call. In this example, mobile client device 13 is shown sending a message 16 to a directory server 14 to access a set of rules that may be applied to the incoming call. Message 16 includes the user or caller ID received by device 13 via the non-voice data channel of the 3G network. The purpose of message 16 is to request information about the caller (e.g., based on the caller ID), such as which group in the business organization or enterprise the caller works for. In other words, mobile client device 13 uses the caller ID to access directory server 14 to determine information about the caller that can then be used to select the appropriate ring tone to apply to the call.

In response to the directory lookup, server 14 sends a return message 17 to mobile client device 13. Message 17 includes information about the caller. Upon receiving message 17, mobile client device determines the appropriate ring tone and any additional presentation information to be applied to the call based on the information received in message 17. Mobile client device 13 then applies the selected ring tone to the incoming call. Note that all of this occurs while the call setup negotiation is in progress.

It should be understood that in the embodiment of FIG. 1 all of the ring tone or presentation rules reside within a module or memory on the mobile client device. For example, the user of mobile client device 13 could have a client rule (stored therein) which says that custom ring tone #21 (e.g., a happy musical audio clip) is to be played whenever the incoming call is from someone in the user's work group. The client rules stored on mobile client device 13 may be programmed via an ordinary user interface, e.g., a graphical user interface that runs on the mobile client device.

In the case where a call arrives from a person for which there is no entry in directory server 14, a default (e.g., unknown person) ring tone may be applied to the incoming call by mobile client device 13. For instance, ring tone associated with an unknown person may comprise a mysterious musical introduction, such as the musical theme from "The Twilight Zone" television program.

Instead of having the rules reside within the mobile phone or client device, in an alternative embodiment the rules may reside on a network server, e.g., a director server or rules server. In such an embodiment, when an incoming call arrives, it triggers a message sent to the directory server or rules server, which triggers a lookup based on the caller ID and/or call context information. The server determines the appropriate ring tone or presentation for the call and sends that information back to the mobile client device. In this embodiment, every incoming call triggers a call or message sent to the rules server to determine which ring tone is to be applied to the call.

The rules server may send the actual ring tone (e.g., an audio media file or clip) to be applied to the call by the mobile client device. Alternatively, the rules server may send a message indicating a generic category of ring tone that should be applied to the call. For example, the server may indicate that a happy, serious, familial, or other type of musical ring tone should be applied to the call by the client device. The actual audio (or audiovisual) media file used for the ring tone or to present the call may be programmed by the user and stored in memory on the mobile client device.

Figure 2:
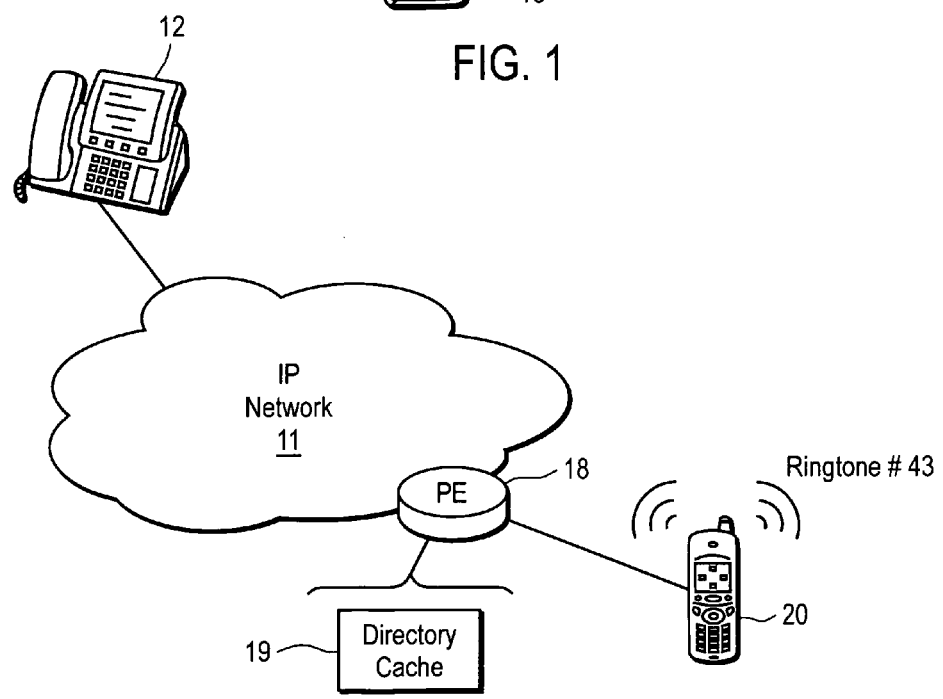
FIG. 2 illustrates another example communications system facilitating a call between an IP phone and a cell phone.

FIG. 2 illustrates another example communications system facilitating a call between an IP phone 12 and a mobile phone 20 over IP network 11. In this embodiment, a directory cache 19 associated with or incorporated in provider edge (PE) device 18 is populated with a set of rules to be applied to anyone calling or called by mobile phone 20. Practitioners in the art will appreciate that by having the directory cache reside at the mobile edge, latency associated with the directory lookup is greatly reduced. In other words, by incorporating a directory cache into PE device 18 the directory lookup performed by mobile phone 20 need not traverse the entire network, i.e., back to a main or central server. Instead, the rules to be applied to the incoming call based on the caller ID and/or contextual information associated with call can be quickly accessed by the mobile client device.

In another embodiment, the presentation or ring tone rules are still located at a network server, but the server does not determine what ring tone to use. Rather, a set of tags or properties are used by the server to communicate the information down to the client. For example, a server rule may be implemented that attaches a "My_Group" tag to an incoming call originating from someone in the same work group as the callee, i.e., the user of the mobile client device. The mobile client device may then have a client rule (stored in memory) that applies a specific ring tone (e.g., ring tone #43) to an incoming call that has a tag "My_Group". This implementation avoids latency issues of the previous embodiment, and allows the client device to determine the appropriate ring tone to use.

Figure 3:
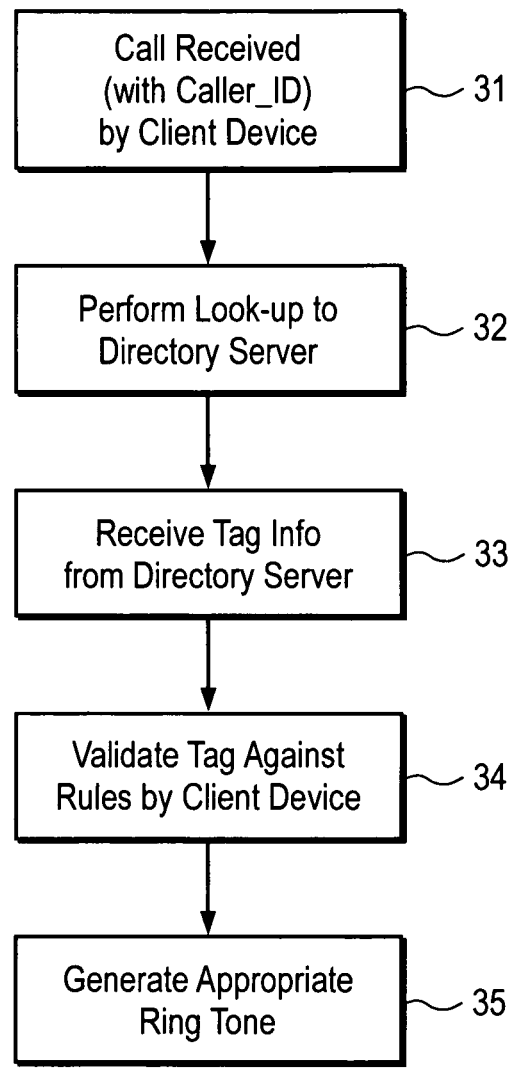
FIG. 3 illustrates an example method of operation for a mobile client device.

FIG. 3 illustrates an example method of operation for a mobile client device. The process flow begins with a call (with caller ID information attached) arriving at the client device (block 31). This automatically triggers a lookup to a directory server located on the network (block 32). The directory server may include a list of all known callers as well as contextual information (e.g., work group) associated with each person. Information about the call and the caller is then returned by the directory server in a message that includes a tag (block 33). As previously discussed, the tag may include information such as the urgency of the call, nature of the call, call communication history or thread (e.g., whether the call is a reply to a voicemail message), the organization or group to which the caller belongs, etc. The mobile client device then validates the tag against a set of client rules stored therein (block 34). For instance, if the tag indicated that the caller was a member of the client's project team, the corresponding client rule may indicate that a certain specific ring tone song (e.g., ring tone #55) is to be generated for presentation of the call. Once the mobile client device has validated the tag against the client rules, the mobile client device generates the appropriate ring tone for the call (block 35).

In yet another embodiment, the tagging concept is utilized for more than directory searches for callers. For example, if someone is returning a call from the user of a mobile phone, communications management software running on the directory or rules server tags the call as "Return_call". That is, the server attaches or associates the Return_call tag with the return call. When the tag arrives at the mobile client device, it triggers the appropriate ring tone or other audio/video presentation of the call. For instance, the user may set the client rules on his device such that all incoming calls are muted except for calls that are returns of missed calls, i.e., calls that return a Return_call tag from the server. The Return_call tag may even trigger the playing of a special or distinctive musical ring tone on the mobile phone. Similarly, a call escalated from an IM conversation (which could be an IM conversation on a different device, other than the mobile phone) could be marked with a separate tag that triggers specialized presentation of the call on the mobile device based on the call history or communication thread leading up to the call. This embodiment allows the power of tagging to be represented in a form convenient for a mobile phone user who may be preoccupied with an important or urgent task (e.g., driving on the freeway).

A Boolean combination of tags may also be used in a client-side rule, such as "if My_Group+Return_Call, use ring tone #23". This allows for even finer granularity of specialized presentation accorded to incoming calls.

Practitioners in the art will appreciate that the foregoing embodiments permit users to hear custom ring tones even for users not in the local address book of the mobile client device. In addition, patterns and dynamic rules can be established for creating custom ring tones. As discussed, call context can be used for determining the ring tone or presentation of a call. The call context may include information such as the reason why a call was made, the geographic location of the caller, previous communications between the caller and callee (e.g. returning a previous a voicemail message left in the caller's mailbox), and the urgency or priority of the call.

In still other embodiments, ordinary text or text messages may be utilized to convey context information associated with the incoming call. In such embodiments, parsing software and natural language recognition software may be utilized to recognize certain key words or phrases that can be used as a basis for determining which ring tone or category of ring tone should be applied to an incoming call to a mobile client device.

Furthermore, it should be understood that the concepts and embodiment presented herein are not just limited to generating a ring tone for an incoming call to mobile device. Rather, the entire presentation of the call on the device may be configured based on caller ID and/or call context information. For example, if the mobile phone is in a vibrate mode of operation and an urgent call arrives, the rules may be configured such that the mobile phone responds by transitioning the alert settings of the device to a loud audio mode of operation using a specific custom ring tone that alerts the user that an urgent call has arrived.

In yet another embodiment, the mobile client device sends information about its device type to the server (e.g., manufacturer/model number, list of stored ring tone songs and audio media files, polyphonic capabilities, etc.), so that the server knows which ring tones the mobile client device is capable of playing. Because different mobile phones have different ring tone capabilities, when the lookup is performed, the phone may also send information about its audio playback capabilities to the server. In this way, the server is able to map distinctive ring tone categories (e.g., happy, urgent, unknown caller, etc.) to the specific ring tones installed on the device. In still other implementations, the user can specify certain ring tones to play in each category, essentially overriding server selection.

Figure 4:
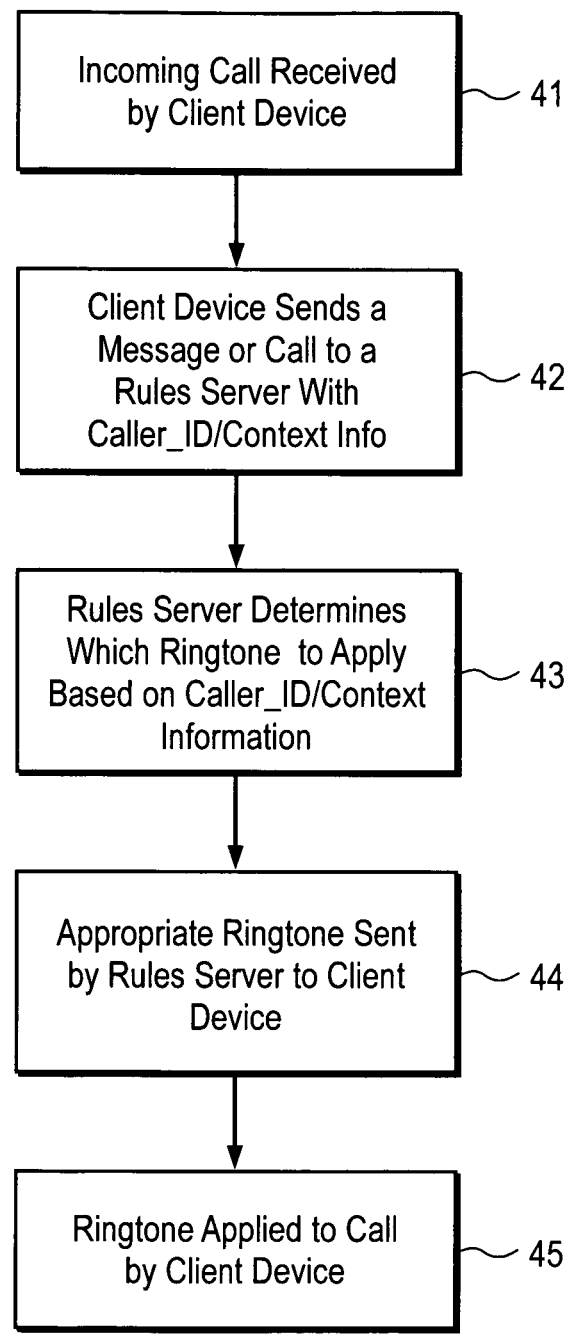
FIG. 4 illustrates another example method of operation for an IP communications system configured for providing a customized ring tone for an incoming call to a mobile client device.

FIG. 4 illustrates another example method of operation for an IP communications system configured for applying a customized ring tone to an incoming call to a mobile client device. In this example, after the incoming call has been received by the mobile client device (block 41), it sends a message or call to a rules server located on the IP network. The message from the mobile client device to the server, in one embodiment, includes both the caller ID and the call context information (block 42). The rules server then determines which ring tone to apply to the incoming call based on the caller ID/context information received (block 43). Next, the rules server sends a message back to the client device with an attached audio media file of the ring tone to be applied to the call on the client device (block 44). In other words, in this embodiment the mobile client device need not store any of the customized ring tone media files are to be applied to an incoming call since the actual media file for the ring tone is downloaded to the client device from the rules server. In another embodiment, the media file may be stored on the device. Immediately after the custom ring tone is received by the mobile client device, it is applied to the incoming call (block 45).

Figure 5:
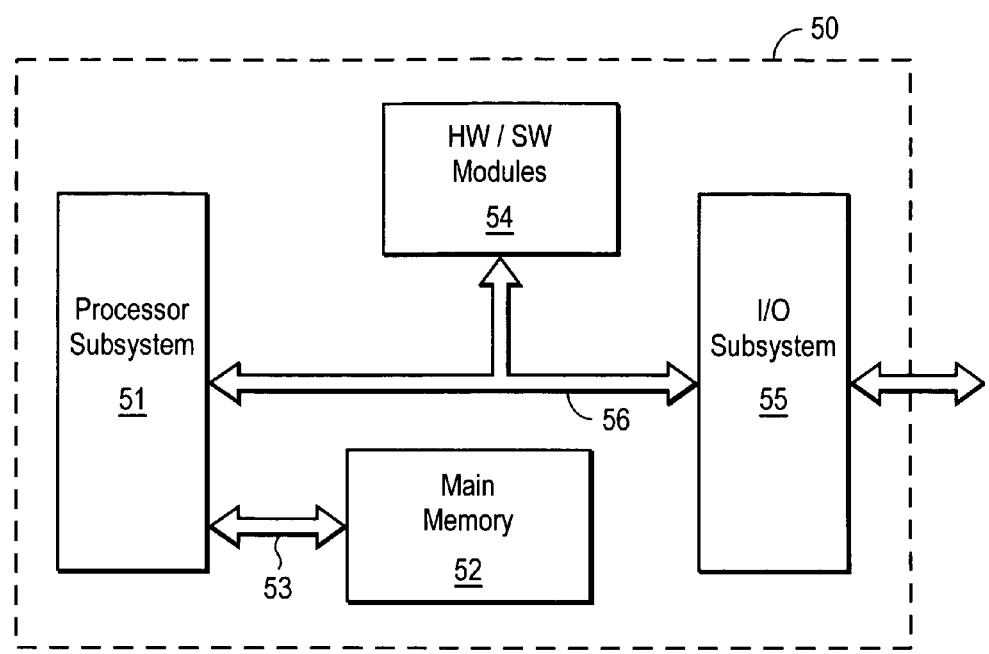
FIG. 5 illustrates an example network node or client device.

FIG. 5 is a generalized block diagram showing an example network device or node 50, such as may comprise any of the servers, client devices, or nodes (e.g., a cell phone, mobile client device, PC, PE device, or server) shown or described above. Node 50 includes a processor subsystem 51 coupled with a memory unit 52, one or more hardware/software modules 54, and an input/output (I/O) subsystem 55. In this embodiment, I/O subsystem 55 is shown coupled with modules 54 and processor subsystem 51 via a system bus 56. I/O subsystem 55 also has an external interface for connecting node 50 other network devices. Modules 54 may include software, firmware, or logic embedded in hardware for implementing any of the functions described herein, e.g., those functions for using one or more tags associated with a call to generate a custom mobile ring tone.

It is appreciated that any Unified Mobile Communicator and/or mobile communications system utilized by or in conjunction with node 50 may comprise separate hardware devices coupled to the system bus 56 via I/O subsystem 55, or, alternatively, implemented as software programs or modules 54 that run on one or more processors of subsystem 51. In other words, the sending, receiving of messages to/from the server as well as other associated functions may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. For instance, although functions and methods of various embodiments have been described as being embodied on a Unified Mobile Communicator and/or mobile communications system coupled to a server via an IP network, it is appreciated that these same methods and functions may be embodied on another type of server or network device, or a third party service application program accessible via a web-based browser. Accordingly, the specification and drawings are to be regarded in an illustrative rather than a restrictive sense.

We claim:

1. A method comprising:
receiving, by a mobile client device, an incoming call sent by a caller, a caller ID being associated with the incoming call;
accessing one or more nodes connected to a packet-based network to obtain, based on the caller ID, call context information associated with the incoming call, wherein the call context information comprises information about the call not included in the caller ID,
at least one of the one or more nodes comprising a provider edge (PE) device, the call context information comprising:
a business organization affiliation associated with the caller ID;
a priority level for the call; and
a reason for the call, the reason the call comprising at least one from the set comprising:
responding to a previous call;
scheduling a meeting; and
responding to a text communication;
receiving, by the mobile client device, the call context information from the one or more nodes;
applying, by the mobile client device, the received call context information to a set of client rules to select a specific ring tone from a plurality of ring tones stored on the mobile client device;
sending information about an audio playback capability of the mobile client device to the one or more nodes, wherein the information about the audio playback capability of the mobile client device includes device type information about the mobile client device; and
generating the specific ring tone on the mobile client device to announce the incoming call.

2. The method of claim 1 wherein at least one of the one or more nodes comprises a server.

3. The method of claim 1 wherein the packet-based network comprises a 3G network, the caller ID being received by the mobile client device via a non-voice data channel.

4. The method of claim 1 wherein the information about the caller includes a business organization affiliation of the caller.

5. The method of claim 1 wherein the accessing of the one or more nodes comprises performing a lookup to a directory embedded within or coupled to the one or more nodes.

6. The method of claim 1 wherein the call context includes a call type.

7. A method comprising:
receiving, by a mobile client device, an incoming call from a caller, a caller ID and call context information being associated with the incoming call, wherein the call context information comprises information about the call not included in the caller ID,
the call context information comprising:
a business organization affiliation associated with the caller ID;
a priority level for the call; and
a reason for the call, the reason for the call comprising at least one from the set comprising:
responding to a previous call;
scheduling a meeting; and
responding to a text communication;
performing, by the mobile client device, a lookup to a server based on the caller ID and the call context information, the server comprising a provider edge (PE) device;
receiving, by the mobile client device, a message from the server based on the caller ID and the call context information that includes one or more tags obtained in response to the lookup;
validating the one or more tags against a set of client rules to select a presentation of the incoming call on the mobile client device, the presentation including a selected one of a plurality of ring tones;
sending information about an audio playback capability of the mobile client device to the server, wherein the information about the audio playback capability of the mobile client device includes device type information about the mobile client device; and
playing the selected one of the ring tones on the mobile client device.

8. The method of claim 7 wherein the device type information includes a manufacturer and model number of the mobile client device.

9. The method of claim 7 wherein the device type information includes a list of stored ring tone media files.

10. The method of claim 7 wherein the server is located on a packet-based network and the caller ID and call context information are received on a non-voice data channel of the packet-based network.

11. The method of claim 7 wherein the presentation of the incoming call comprises an audiovisual presentation.

12. The method of claim 7 further comprising receiving, by the mobile client device, a media file attached to the message received from the server, the media file including the selected one of the ring tones.

13. A non-transitory computer readable memory encoded with a computer program product when executed the computer program product operable to:
send a first message to a server of an Internet Protocol (IP) network responsive to an incoming call received by a mobile client device, the first message including a caller ID and call context information, wherein the call context information comprises information about the call not included in the caller ID,
the server comprising a provider edge (PE) device,
the call context information comprising:
    a business organization affiliation associated with the caller ID;
    a priority level for the call; and
    a reason for the call, the reason for the call comprising at least one from the set comprising:
        responding to a previous call;
        scheduling a meeting; and
        responding to a text communication;
receive a second message, based on the caller ID and call context information, that includes an attached audio media file containing a custom ring tone;
send information about an audio playback capability of the mobile client device to the server, wherein the information about the audio playback capability of the mobile client device includes device type information about the mobile client device; and
play the custom ring tone on the mobile client device to announce the incoming call.

14. The non-transitory computer readable memory of claim 13 wherein computer program product, when executed, is further operable to change a current alert mode setting on the mobile client device responsive to the second message.

15. The non-transitory computer readable memory of claim 13 wherein the call context information includes a group affiliation of the caller.

16. The non-transitory computer readable memory of claim 13 wherein the call context information includes a call type.

17. An apparatus comprising:
one or more processors; and
a memory at a provider edge (PE) device comprising one or more instructions executable at the processors, the one or more processors being operable, when executing the instructions, to:
apply a set of logical rules to a caller ID and call context information of an incoming call to a mobile client device, the call context information comprising information about the call not included in the caller ID, the application of the logical rules producing one or more tags that categorize the incoming call as a specific type of call,
the call context information comprising:
    a business organization affiliation associated with the caller ID;
    a priority level for the call; and
    a reason for the call, the reason for the call comprising at least one from the set comprising:
        responding to a previous call;
        scheduling a meeting; and
        responding to a text communication;
receive information about an audio playback capability of the mobile client device, wherein the information about the audio playback capability of the mobile client device includes device type information about the mobile client device; and
send the one or more tags to the mobile client device to facilitate the mobile client device playing a ring tone corresponding to the specific type of call to announce the incoming call.

18. The apparatus of claim 17 wherein the call context information includes a communication thread associated with the incoming call.

19. The apparatus of claim 17 wherein the call context information includes a group affiliation associated with the caller ID.

* * * * *